(12) United States Patent
Worton et al.

(10) Patent No.: US 8,813,637 B2
(45) Date of Patent: *Aug. 26, 2014

(54) HEATING RACK

(76) Inventors: Ian Geoffrey Worton, Walsall (GB);
Peter Karl Neath, Walsall (GB)

(*) Notice: Subject to any disclaimer, the term of this patent is extended or adjusted under 35 U.S.C. 154(b) by 636 days.

This patent is subject to a terminal disclaimer.

(21) Appl. No.: 11/597,001

(22) PCT Filed: May 10, 2005

(86) PCT No.: PCT/GB2005/001769
§ 371 (c)(1),
(2), (4) Date: Nov. 17, 2006

(87) PCT Pub. No.: WO2005/112719
PCT Pub. Date: Dec. 1, 2005

(65) Prior Publication Data
US 2008/0190302 A1   Aug. 14, 2008

(30) Foreign Application Priority Data
May 19, 2004  (GB) .................................. 0411092.0

(51) Int. Cl.
*A47J 37/07*  (2006.01)
(52) U.S. Cl.
USPC .................................. 99/450; 99/445; 99/446
(58) Field of Classification Search
CPC .............................. A47J 37/0694; A47J 37/07
USPC .............................. 99/445, 446, 450; 126/9 R
See application file for complete search history.

(56) References Cited

U.S. PATENT DOCUMENTS

| | | | | |
|---|---|---|---|---|
| 3,973 A | * | 3/1845 | Hawkins | 99/445 |
| 3,092,015 A | * | 6/1963 | Tucker et al. | 99/446 |
| 3,443,510 A | * | 5/1969 | Norton | 99/445 |
| 4,598,634 A | * | 7/1986 | Van Horn, II | 99/340 |
| 4,969,449 A | * | 11/1990 | Levin | 126/332 |
| 5,259,299 A | * | 11/1993 | Ferraro | 99/340 |
| 5,347,978 A | * | 9/1994 | Zuran | 126/41 R |
| 5,363,752 A | * | 11/1994 | Weil | 99/445 |
| 5,911,812 A | * | 6/1999 | Stanek et al. | 99/446 |
| 7,506,579 B2 | * | 3/2009 | Worton et al. | 99/446 |

FOREIGN PATENT DOCUMENTS

| | | |
|---|---|---|
| DE | 25 29 409 | 1/1977 |
| DE | 198 52 579 | 5/2000 |
| GB | 2156201 A * | 10/1985 |
| WO | WO 2004/041041 | 5/2004 |

* cited by examiner

*Primary Examiner* — John Wasaff
(74) *Attorney, Agent, or Firm* — Young & Thompson

(57) ABSTRACT

A heating rack includes a plurality of elongate collector units (26), each elongate collector unit including an elongate support section (126) which defines a contact surface for supporting an object (16) to be heated and an elongate collector section (226) shaped to define a channel (35) for receiving exudate flowing via the support sections from a supported object and, in use, to direct the exudate to a collection zone at an end of the channel, wherein the support section and collector section are spaced apart over at least a part of the length of the elongate collector unit.

25 Claims, 8 Drawing Sheets

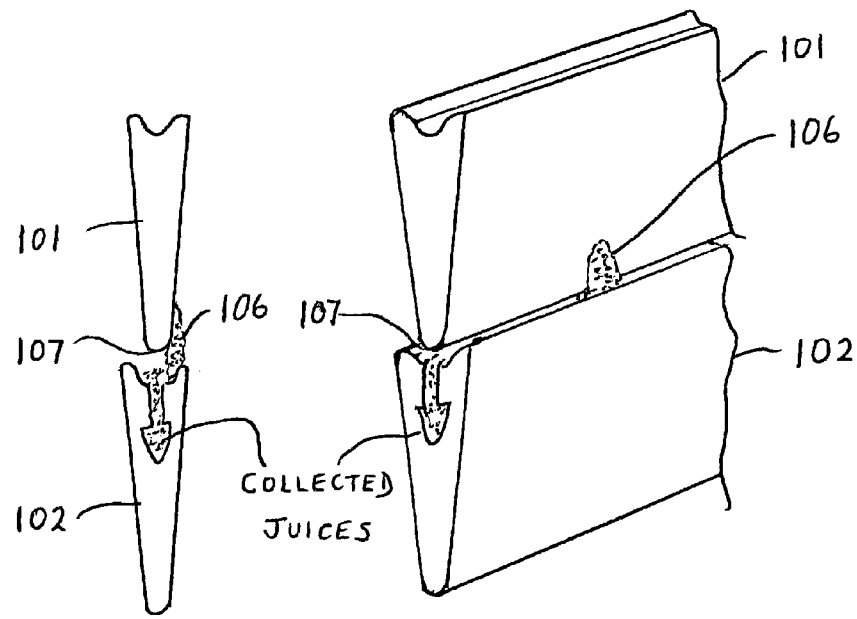
FIG. 11
FIG. 12
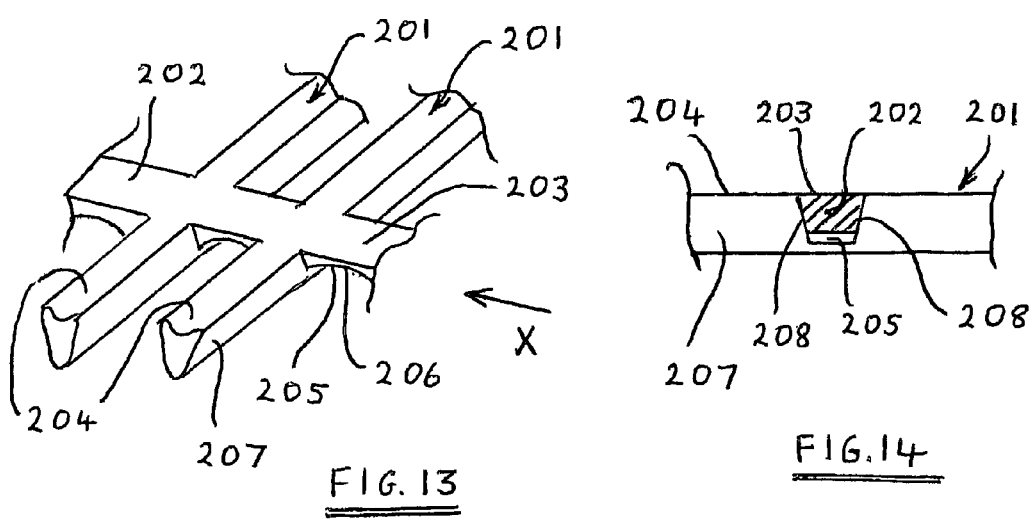
FIG. 13
FIG. 14

HEATING RACK

BACKGROUND OF THE INVENTION

1. Field of the Invention

This invention relates to a heating rack and in particular, although not exclusively, to a heating rack for heating and cooking food. The invention has particular relevance to the cooking of fatty foods over naked flames such as in use of barbecues.

2. Description of the Related Art

It is to be understood that the present invention is not confined to a heating rack for a barbecue and may be applied to, for example, cooking ovens or grills and industrial ovens. Where the context permits, the present invention may be used in the heating of other objects where heating an object results in the melting or exuding of at least a part of the object.

One of the main problems with cooking fatty foods such as sausages, meats kebabs, beef burgers and the like over charcoal or gas heated synthetic charcoal or coals, is that the fat runs down and drips onto the heated coals and ignites. This causes flames to rise and overcook or burn the food being cooked, and a resulting flare-up may cause personal danger to the user.

There have been a number of attempts, some very complex, to prevent the fat from igniting. For example in U.S. Pat. No. 5,105,725, there is shown a grill having a grid element. The grid element comprises a base element and upstanding ribs. Openings are provided.

One problem associated with the prior art is that those solutions have resulted in a reduction of direct heat radiation from the heat source. That is undesirable because it reduces the cooking efficiency.

In the specification of our co-pending International Patent Application No. PCT/GB 03/004807 we have described and claimed a heating rack comprising a plurality of elongate members, each elongate member having a contact surface on which an object to be heated is placed to be exposed to a heat source and a first lateral portion shaped to form a channel disposed below the contact surface for receiving and directing exudate from the object to a collection zone at one or both ends of the channel, each said elongate member being spaced from an adjacent elongate member to expose the object directly to the heat source when placed at any position along the contact surface.

SUMMARY OF THE INVENTION

An object of the present invention is to provide an improvement in or a modification of the heating rack of said co-pending International Patent Application.

In accordance with one aspect of the present invention there is provided a heating rack comprising a plurality of elongate collector units, each elongate collector unit comprising an elongate support section which defines a contact surface for supporting an object to be heated and an elongate collector section shaped to define a channel for receiving exudate from a supported object and, in use, to direct said exudate to a collection zone at an end of the channel, wherein said support section and collector section are spaced apart over at least a part of the length of the elongate collector unit.

Thus, in contrast to the embodiments described in the aforementioned International Patent Application, the present invention teaches that the heating rack may comprise an elongate member in the form of an elongate collector unit in which the support and collector sections are spaced apart over at least a part of the length of the elongate collector unit. However, in common with said embodiments of the aforementioned application, the present invention envisages that exudate shall flow in a controlled manner via the support sections to the respective collector sections instead of predominantly dripping directly downwards between the successive contact surfaces and onto a source of heat, such as that from a bed of charcoal.

The support and collector sections may be spaced apart along substantially the whole of the length of the elongate collector unit, and may be fixed in position relative to one another by virtue of each being attached to a frame member. Said frame member may be employed also to locate and maintain spaced apart a plurality of the elongate collector units.

Alternatively the support and collector sections of a collector unit may be in contact with one another at one or more positions between the respective ends of the support and collector sections. The two sections may be joined together at said points of contact whereby the two sections of a collector unit provide mutual structural support for one another. Preferably the two section are spaced apart over at least 50%, and more preferably over at least 75% of the length of the collector unit.

Preferably the spacing between the support and collector sections is at least 0.1 mm, more preferably at least 1 mm whereby exudate flowing down a first side surface of the support section may pass underneath that support section, between said collector section and the channel of the collector section, to a position substantially underneath a second side surface of the support section. Thus, in the event that any debris has accumulated in a part of the channel under the first side of the support section, exudate can circumvent that debris by flowing underneath the support section to that part of the channel underneath said other, second side surface of the support section. Preferably, for most applications, said spacing is less than 10 mm, more preferably less than 5 mm. Optionally that spacing may be sufficiently small to result in flow from the support section to the collector section being in the form of a film under the influence of surface tension effect, and not by a drip action.

In the case of an elongate collector unit in which the support and collector sections are not joined to one another between the ends thereof, said sections may be supported relative to one another by means of transverse spacer means such as a frame member, in a manner which allows the sections to be separated for cleaning purposes. Thus, one of the two sections may be secured substantially permanently to a frame member and the other section may be selectively releasably secured to that frame member. Alternatively a plurality of support sections may be secured to a first frame member and a plurality of respective collector sections may be secured to a second frame member in a manner in which the positioning and separation of associated support and collector sections may be achieved by locating together or separating the two frame members.

One or each of the support and collector sections may be formed from sheet metal. Alternatively, one or both of the support and collector sections may be formed from cast metal, e.g. cast iron, aluminium or stainless steel, or other cast materials such as ceramics.

Preferably the spacing between the contact surfaces of successive support sections is between 5 mm and 15 mm, particularly in the case of a heating rack to be employed in a barbecue. Although the heating rack will operate successfully to collect exudate if the spacing of successive collector surfaces is less than 5 mm it is considered that that spacing is generally necessary in order to ensure that at least the spacing of successive collector sections is sufficient to allow a useful degree of direct radiant heating and convection heating through the heating rack. In particular, it is preferred that the spacing of neighbouring edges of successive collector sections is at least 3 mm, preferably 8 mm or more.

The support section may have, in transverse cross-section, a substantially rectangular shape. That is, the support section may be formed from a rectangular section strip of steel, or it may be cast or extruded or pultruded to that or a similar shape. Other potentially suitable shapes for the support section are as disclosed in the aforementioned co-pending International Patent Application. Typically, in use, a support section of generally rectangular cross-section will be arranged with the longer side vertical, but the longer side may alternatively be arranged to lie horizontally. A square cross-section is also contemplated. An upper surface of the support section, the contact surface, may be shaped to provide a trough which extends lengthwise of that section.

The collector section surface which faces the support section may have in transverse cross-section a shape which is substantially curved or of an angled form, e.g. "V" shape is transverse section thereby to define said channel.

More generally, it is taught that the collector section, and optionally also the support section, may have a maximum width in the lower half thereof which is less than the maximum width in the upper half thereof, the upper half being that half which is closest to the contact surface of the collector unit. It is also preferred that the minimum spacing of successive collector units is that between the contact surfaces, or the region of the side surfaces closest to said contact surfaces. Thus, as in the case of the above referred V shape, there is good provision for direct radiation of heat to the object to be heated.

In a further of its aspects the present invention envisages that the collector and support sections may be of identical or substantially similar transverse cross-sectional shapes.

It has been described above that a plurality of the elongate collector units may be maintained spaced apart by a frame member. Another construction taught by the present invention for maintaining collector units transversely spaced comprises connector sections which extend between the respective ends of neighbouring collector units. Additionally or alternatively neighbouring collector units of a pair may be maintained spaced apart by one or more intermediate bridge sections positioned between the ends of the collector units. Any said bridge sections may extend between the support sections and/or collector sections of a pair of neighbouring collector units.

If two successive collector units are each of a kind comprising support and collector sections which are joined to, or integral with, other over a part of their respective lengths, it is envisaged that generally it will be preferable to provide the bridge section(s) solely between the collector sections. If two successive collector units each comprise support and collector sections which are separable from one another, it is taught that the bridge section(s) may be provided between the support sections.

If a bridge section is provided between two support sections it is preferred that the bridge section has transverse side surfaces which incline towards one another as considered in a downwards direction from the contact surfaces of the adjacent support section closest to the collector section. Similarly it is preferred that an underside surface of the bridge section, opposite an upper surface which, in use, supports or confronts an object to be heated, is of a profile which inclines in a downwards direction, away from the support section contact surface, from a position mid-way between neighbouring support sections to the positions at which ends of the bridge section contact the respective support sections of a pair of neighbouring collector units. Thus any exudate received by the bridge section is directed to flow towards the collector sections and to be restrained from dripping downwards between the collector units.

A bridge section may have a substantially planar upper surface for confronting an object to be heated, and that surface may be substantially co-planar with the contact surfaces of the two support sections between which the bridge section extends.

Although the provision of an intermediate bridge section has been described above in the context of a heating rack comprising a collector unit having support and collector sections which are spaced apart over at least a part of the length of the collector unit, it is to be understood that in another aspect of the present invention said intermediate bridge section(s) may be provided in the context of elongate members comprising support and collector sections which are not spaced apart.

Each elongate collector unit, or at least the collector section thereof, may be non-rectilinear as considered in a plane substantially perpendicular to the contact surface and parallel with the length of the elongate member. It may be curved or of an inverted V shape in said section such that exudate entering the collection channel is encouraged to flow in a direction towards an end of the channel.

In a further of its aspects the present invention provides a heating rack assembly comprising the heating rack of the invention and support structure wherein said support structure supports the elongate collector units in a manner in which the collector channels are each inclined to the horizontal thereby to encourage flow of exudate lengthwise in the channels.

BRIEF DESCRIPTION OF THE DRAWING FIGURES

Embodiments of the present invention will now be described by way of example only, with reference to the accompanying diagrammatic drawings, in which: —

FIGS. 11 and 12 show respectively in cross-section and in perspective the manner in which a collector unit of the present invention performs in the case of a partial blockage;

FIG. 13 is a perspective view of part of another heating rack in accordance with the present invention, and FIG. 14 is a sectional view in the direction of the arrow X of FIG. 13 and taken in a plane mid-way between collector units.

DETAILED DESCRIPTION OF THE INVENTION

Figure 1:
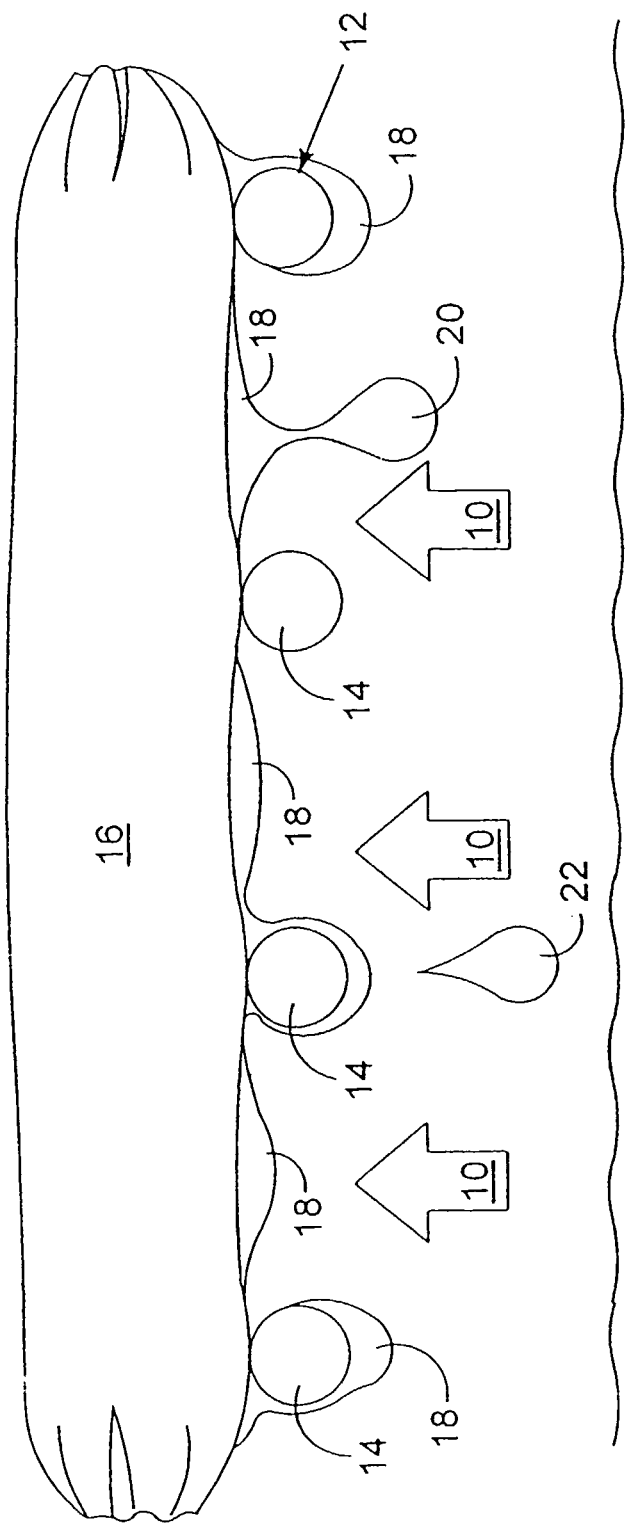
FIG. 1 shows schematically a cross-sectional view of a prior known barbecue using a known design of heating rack.

A known barbecue, see FIG. 1, comprises a heat source 10 provided by, for example, a naked flame, hot glowing charcoal, coke or coal, or synthetic heated coals made from ceramics, cement or porous volcanic rocks and heated by a gas flame. A rack 12 is positioned above the heat source 10 to support the food 16 which is to be cooked. The rack 12 comprises a plurality of rack members in the form of spaced elongate bars 14 of circular cross-sectional shape. The bars 14 are welded to a support frame (not shown) that extends transverse to the length of the bars.

FIG. 1 further shows a sausage being heated by the heat source 10 to a temperature at which fat 18 from within the sausage starts to melt and run along the underside of the sausage. The fat builds up into a droplet 20 that conventionally then falls onto the heat source 10 and ignites. Some of the melted fat 18 runs along the underside of the sausage until it touches the bars 14. The melted fat then builds up around the bars and drips off the underside of the bars as a droplet 22 and again, in consequence, the fat ignites or produces smoke. The increased flame activity due to the burning fat results in the sausage 16 being burnt or overcooked, and also produces a further flow of fat and juices that fall onto the heat source 10. Thus, potentially the cooking of the sausage 16 and other food on the rack 12 will proceed in an uncontrollable manner.

Figure 2:
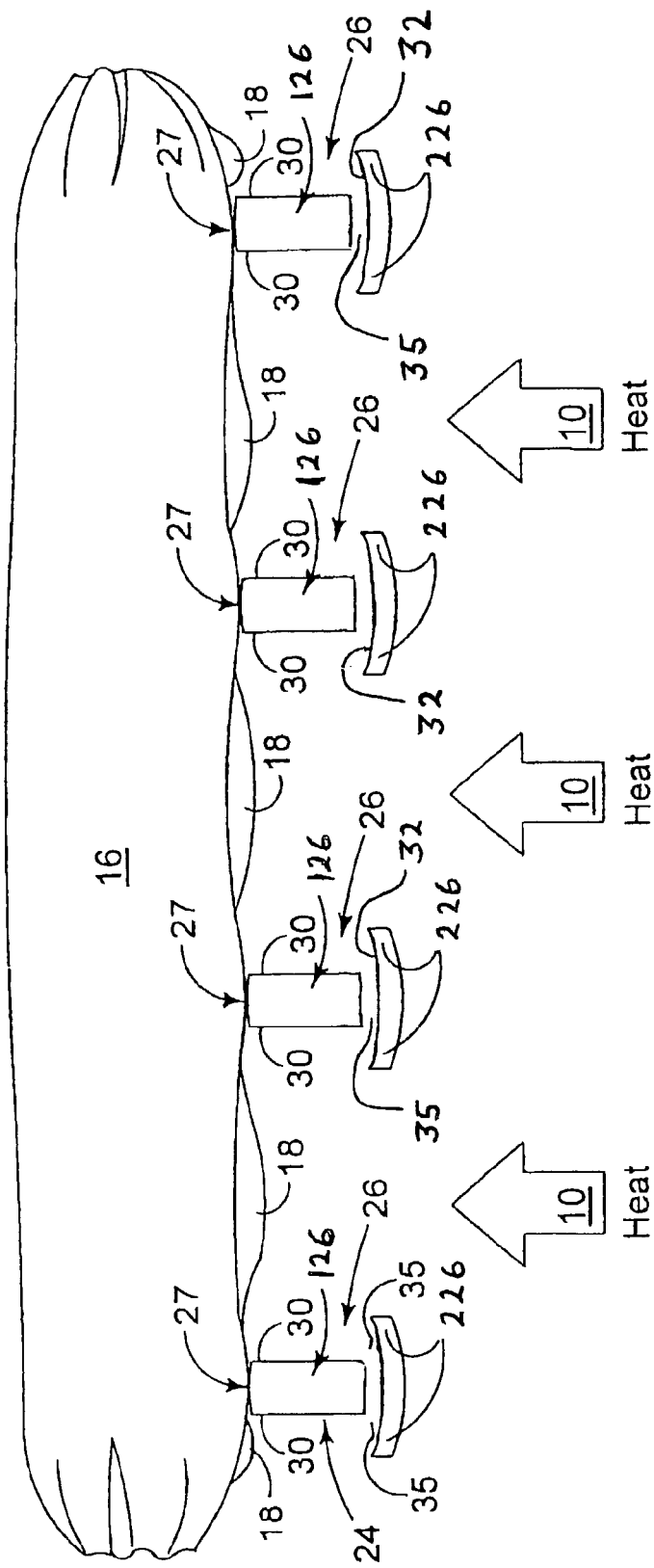
FIGS. 2 and 3 show schematically cross-sectional views of heating rack members constructed in accordance with one aspect of the present invention, and show the stages of cooking a sausage.
Figure 3:
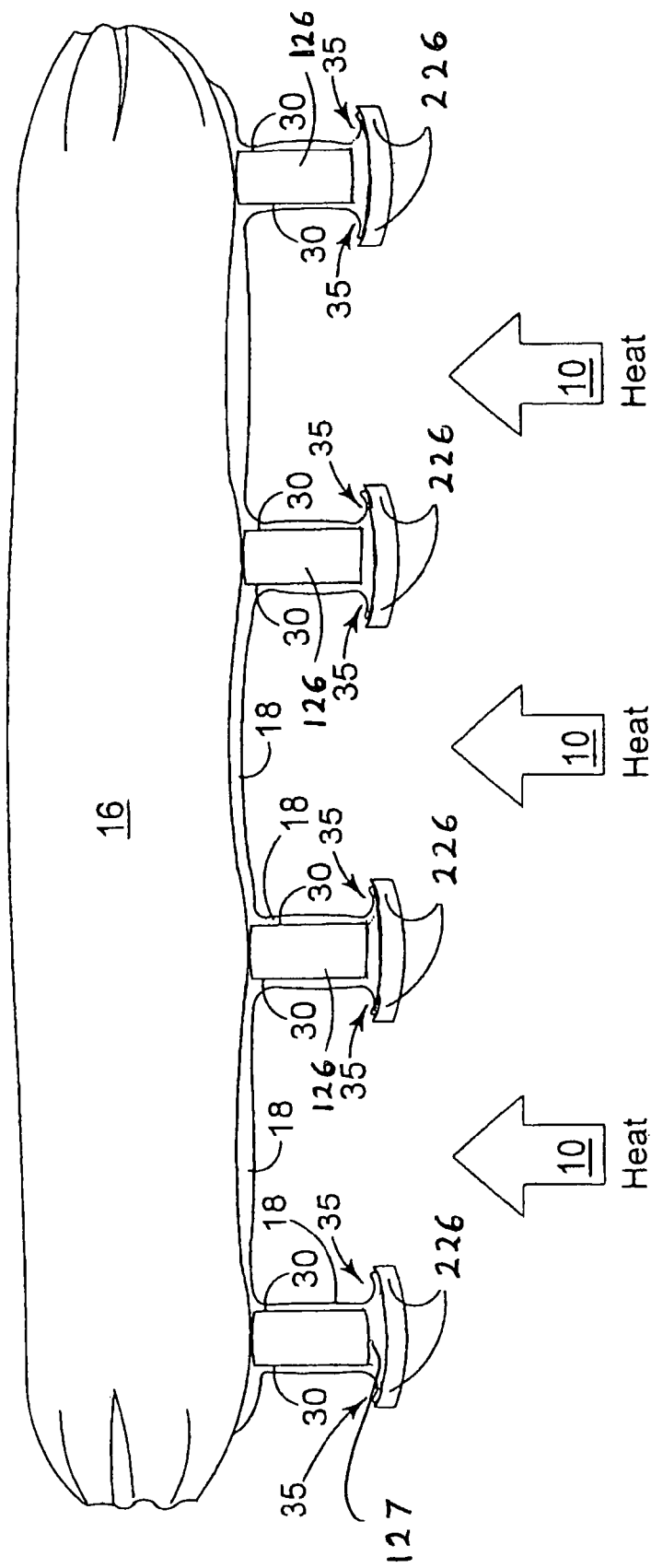

Referring to FIGS. 2 and 3, there is shown a rack 24 constructed in accordance with one aspect of the present invention and which performs a function generally similar to the rack 12 of FIG. 1. However, instead of the aforedescribed conventional circular section bars 14, in accordance with the present invention the rack 24 comprises a plurality of mutually parallel and spaced apart elongate collector units 26 each formed from stainless steel strip.

Each collector unit 26 is of a two part construction comprising an elongate support section 126 and an elongate collector section 226. The two sections are maintained parallel with one another in the required relative orientation, with a small spacing therebetween. That positioning is achieved by each end of each section being secured, e.g. by welding, to a support frame (not shown). That frame also serves to maintain each of the collector units of the plurality of collector units mutually parallel and spaced apart.

Each support section 126 has a contact surface 27 on which an object to be heated is placed to be exposed to the heat source 10. The section 126 is of a substantially rectangular shape in cross-section, and is arranged, in use, with the side faces 30 thereof extending substantially vertically, said side faces being of greater dimension in cross-section than the contact surface 27. (It is not essential, however, for the section 126 to be vertical. It could be inclined away from a vertical axis provided that the side faces 30 of the support section 126 extend generally in a downward direction.)

The neighbouring edges of successive support surfaces 27 are spaced apart by between 5 and 15 mm, more particularly in this embodiment they are spaced apart by 10 mm.

The other shorter side 127 of the rectangular cross-section confronts the collector section 226 and is spaced therefrom by a distance in the range 0.1 mm to 5 mm, more preferably between 1 mm and 2 mm. Preferably, for a particular use, the gap is selected such that transfer of fat or other exudate is in the form of a film in contrast to transfer by discrete drips falling freely from the support section.

The elongate collector section 226 also is formed from an elongate strip of stainless steel, and is deformed to a curved shape in cross-section. The section 226 is orientated with the concave surface 32 confronting the lower side face 127 of the support section 126, the two sections being arranged symmetrically about a vertical plane which extends centrally through the support section 126. The width of each collector section preferably is in the range 3 mm to 10 mm. More particularly, the spacing between neighbouring edges of successive sections 226 is at least 4 mm and in this embodiment is 10 mm, the section 126 having a width of 2 mm and section 226 having a width of 4 mm.

The concave surface 32 defines a channel 35 which, in use, collects any exudate 18, usually liquid or fat, that flows down either of the side faces 30 of the support section 126.

In use of the heating rack shown in FIG. 2 the melted fat 18 from within the sausage flows to the bottom of the sausage and collects on the underside thereof. Provided that the successive support surfaces 27 are not spaced too far apart, e.g. that they are within the preferred range of 5 to 15 mm, the melted fat will flow along the underside of the sausage under the influence of surface tension effects, until it touches a section 126. As soon as the melted fat comes into contact with a side face 30 of a section 126 it is induced to run down the side face by gravity and surface tension effect and wetting of the faces 30. The exudates 18 collected at the two side faces 30 of each collector unit then enter the channel 35, as shown in FIG. 3.

Assisted by a longitudinal inclination of the channels 35 relative to the horizontal, the melted fat collected in the channels 35 flows to one or both ends of the collector unit. The inclination of the channels 35 can be achieved by inclining each collector unit 26 slightly along its length by mounting in that position relative to a support frame of the collector units, or by the inclined mounting of that support frame to a barbecue housing 38 (see FIG. 6).

Figure 5:
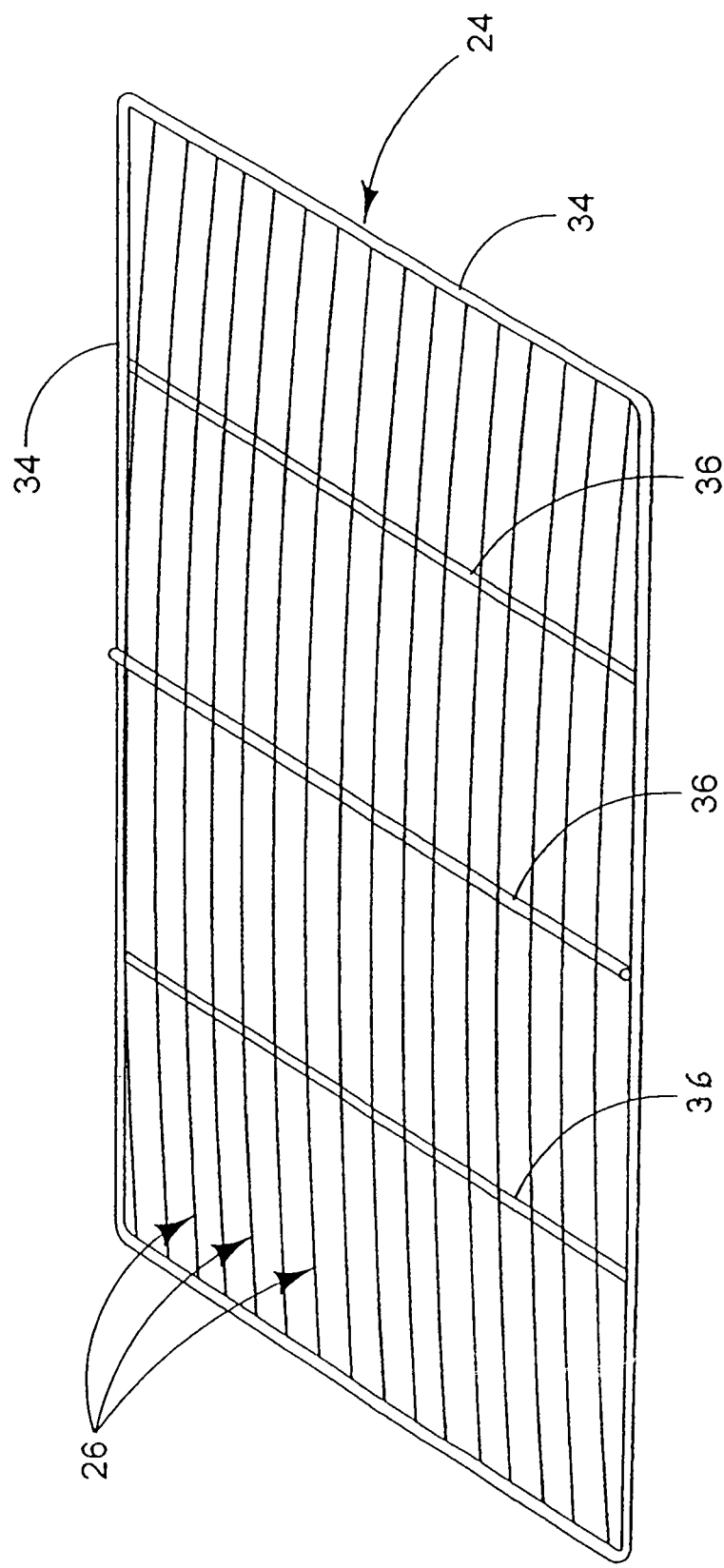
FIG. 5 shows a perspective a heating rack in accordance with the present invention.

Alternatively the collector units 26, or at least the channel sections 226 thereof, may be made slightly curved as shown in FIG. 5, being higher at mid-span than at their ends, with that curvature optionally being maintained with assistance from transverse support bars 36 also welded at their ends to the frame 34. The degree of curvature of the collector units should not be so great as to cause food to be at risk of rolling off the rack, and preferably the rack has said surfaces 27 of the collector units about 1 to 2 mm higher in the centre of the length than at the ends thereof. In a further alternative, instead of being curved along its length the collector unit or channel section thereof may comprise two rectilinear section, e.g. to be substantially of a very shallow V shape as viewed in longitudinal section.

Figure 6:
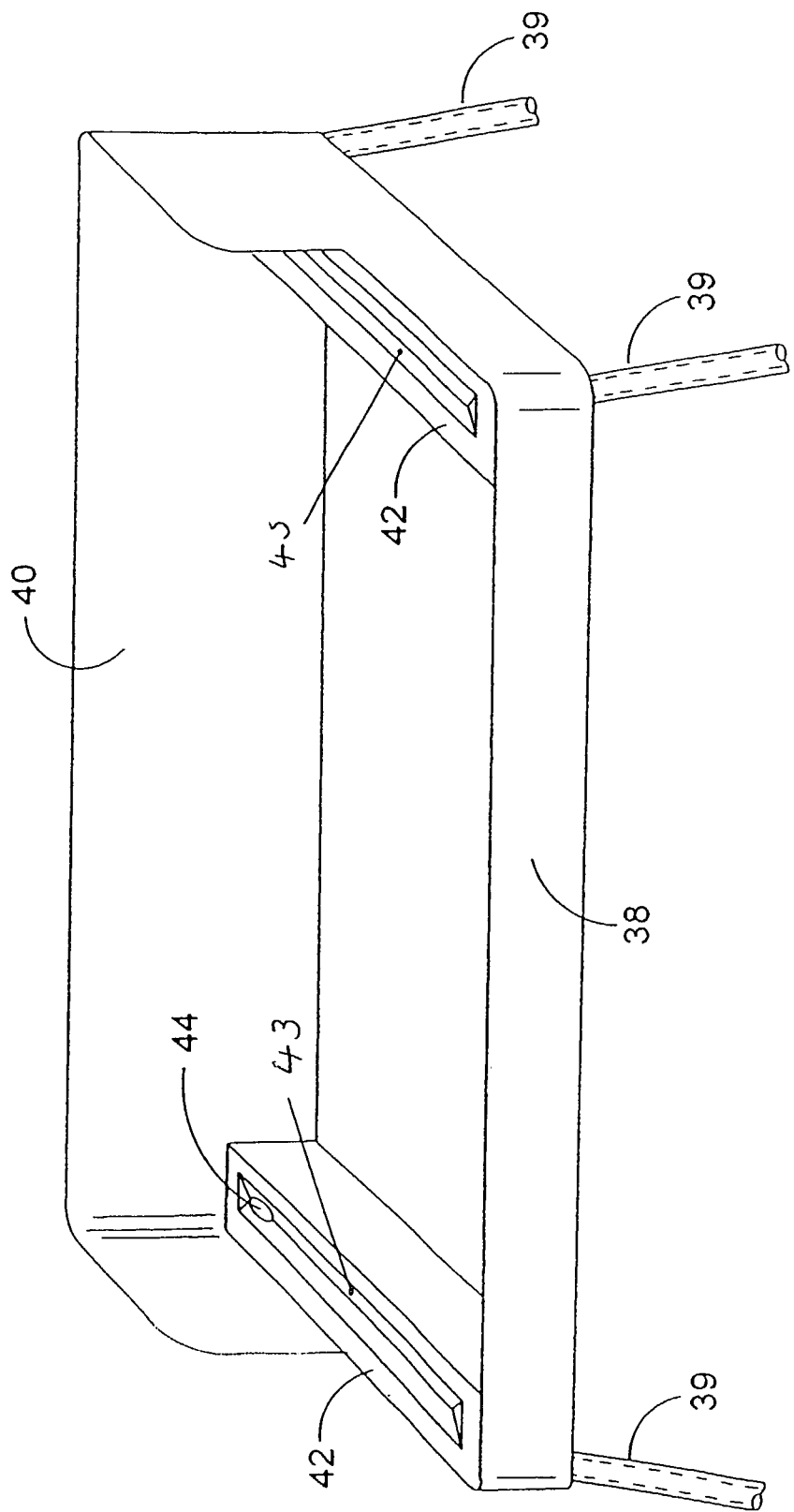
FIG. 6 is a perspective view of a barbecue tray for use with the heating rack of the present invention.

FIG. 6 shows a barbecue tray 38 having four legs 39 and a lid or heat shield 40. Charcoal or a like heat source is placed in the tray 38 and then the rack 24 is positioned over the heat source. (Although a rectangular tray is shown, it will be understood that other shapes such as a circular shape tray and circular shape rack may be employed.)

The tray 38 of FIG. 6 incorporates two ledges 42 onto which the rack 24 is rested. Each ledge 42 has a recess 43 of a V shape section. The rack 24 is positioned with the ends of the collector unit channels 35 terminating above the respective recesses 43. In consequence, molten fat 18 flows along each channel in two directions and is collected in the respective recesses 43. Each recess 43 may slope to the rear of the tray. Furthermore, an aperture 44 may be provided in the bottom of each recess 43 such that melted fat may run out of the recess through the aperture 44 into a container (not shown) positioned under the aperture 44.

The preferred dimensions of the channel 35 are a width which extends by at least 0.5 mm (and preferably around 1 mm) outwards from a respective side face 30 and a height of at least 1 mm (and preferably about 2.5 mm), in order to reduce the risk of the channel being blocked. Other suitable dimensions are that the vertical height of the support section 126 is in the range 5 to 10 mm and the width of the collector section 226 is 3 to 10 mm. These dimensions are provided solely by way of example as an aid to understanding of one preferred embodiment of the invention and it is to be understood that they may be changed without departing from the general scope of the invention.

To ensure that cooking of the food placed on the collector units 26 is achieved as much as possible by direct heating, the collector section 226 should not extend unduly laterally towards one another. It is thereby ensured that there is a good path for radiated and convected heat from the heat source positioned beneath the rack to the food product supported above the rack.

In the aforedescribed construction the collector unit comprises two sections each formed from strips of stainless steel but other materials may be employed. An example of an alternative is another type of steel or cast iron. One or each of the collector unit sections may be chromium plated or enameled. In some applications it may be appropriate to use a material such as PTFE which provides a relatively non-stick surface.

Figure 7:
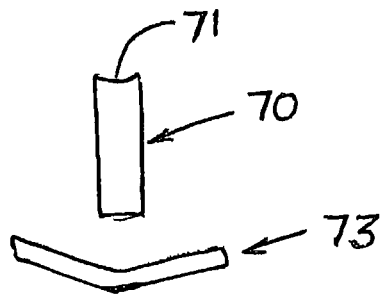
FIGS. 7 to 10 show details of other collector units in accordance with the present invention.

In other embodiments of the present invention a rack comprises collector units in which the two sections thereof are of a slightly different construction. As seen in FIG. 7, a support section 70 has an upper support surface 71 of a concave form such that, particularly if the section 70 is orientated in use to be longitudinally inclined, exudate may flow lengthwise in that channel 71 as well as falling down side faces 72 of the section 70. It is not essential that the collector section 73 is of a curved shape in cross-section and, as also seen in FIG. 7, it may be of a V shape.

Figure 8:
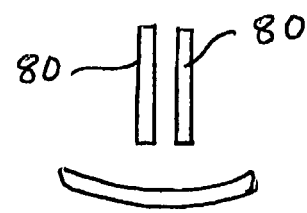

The support section of a collector unit need not be of a unitary construction, and may comprise two vertical sections 80 as seen in FIG. 8, each provided in a vertical orientation and maintained slightly spaced apart by virtue of being welded at respective end regions to a support frame of the rack. Additionally or alternatively two such strips 80 may be secured to one another at spaced apart intervals along their length, e.g. by welding.

Figure 9:
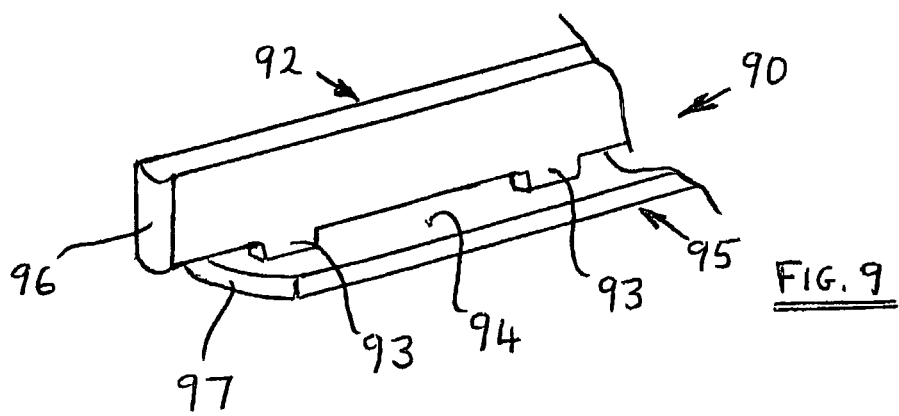

It is also not a specific requirement of the present invention that the support and collector sections are separate from one another and held relative to one another solely at their respective ends. Thus, as shown in FIG. 9, a collector unit 90 may comprise a support section 92 provided at intervals spaced along the length thereof with lugs 93 welded to the upper concave surface 94 of the collector section 95. In a construction of that type it is not necessary that each of the two sections are each secured to a surrounding frame of the rack and, as indicated in FIG. 9, the end 96 of the support section 92 may lie outwards longitudinally from the end 97 of the collector section. In that construction only the ends of the support section need to be secured to a rack frame, and a space is created between the end 97 of the collector section and the frame to allow exudate flowing along the channel to fall from the end of the channel into a collector, such as a collector recesses 43 of the barbecue construction of FIG. 6.

Figure 10:
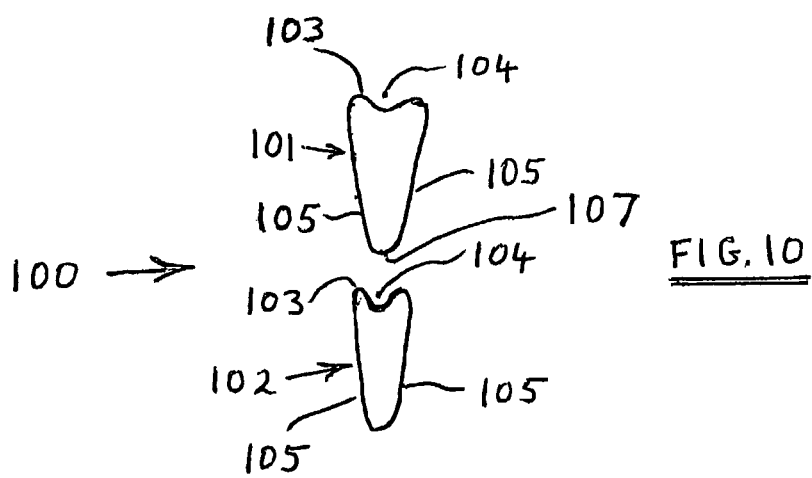

A collector unit 100 of an extruded or cast form is shown in FIG. 10 and comprises support and collector sections 101, 102 which are of identical shape. That shape is substantially of V form and the upper surface 103, as viewed in FIG. 10, is formed with a longitudinally extending trough formation 104. The trough 104 of the support section 101 allows for direct drainage of any exudate from a product resting on that section whilst the trough 104 of the collector section 102 collects any exudate which has run down the side faces 105 of the support section 101.

The collector unit 100 of FIG. 10 is shown in use in FIGS. 11 and 12. This makes clear that if debris 106 blocks one side of the trough 104 of the collector section 102, exudate can flow under the lower edge 107 of the support section 101 and continue lengthwise to an end collecting zone. Thus, by virtue of the support and collector sections not being formed integrally along their whole length there is achieved an improved resistance to overall blockage as compared with a construction having two separate channels with no facility for flow therebetween.

In an embodiment in which the collector unit is of a two part construction either of the two sections, e.g. 101 and 102 of FIG. 10, may be inverted if desired. Similarly both of these independent sections, or the whole of a collector unit of integrated support and collector sections may be held in an orientation inverted relative that above described. An example of a particular instance in which inversion may be desired is if it is wished to clean the collector unit, with the heat source then being run at a high temperature.

Figure 4:
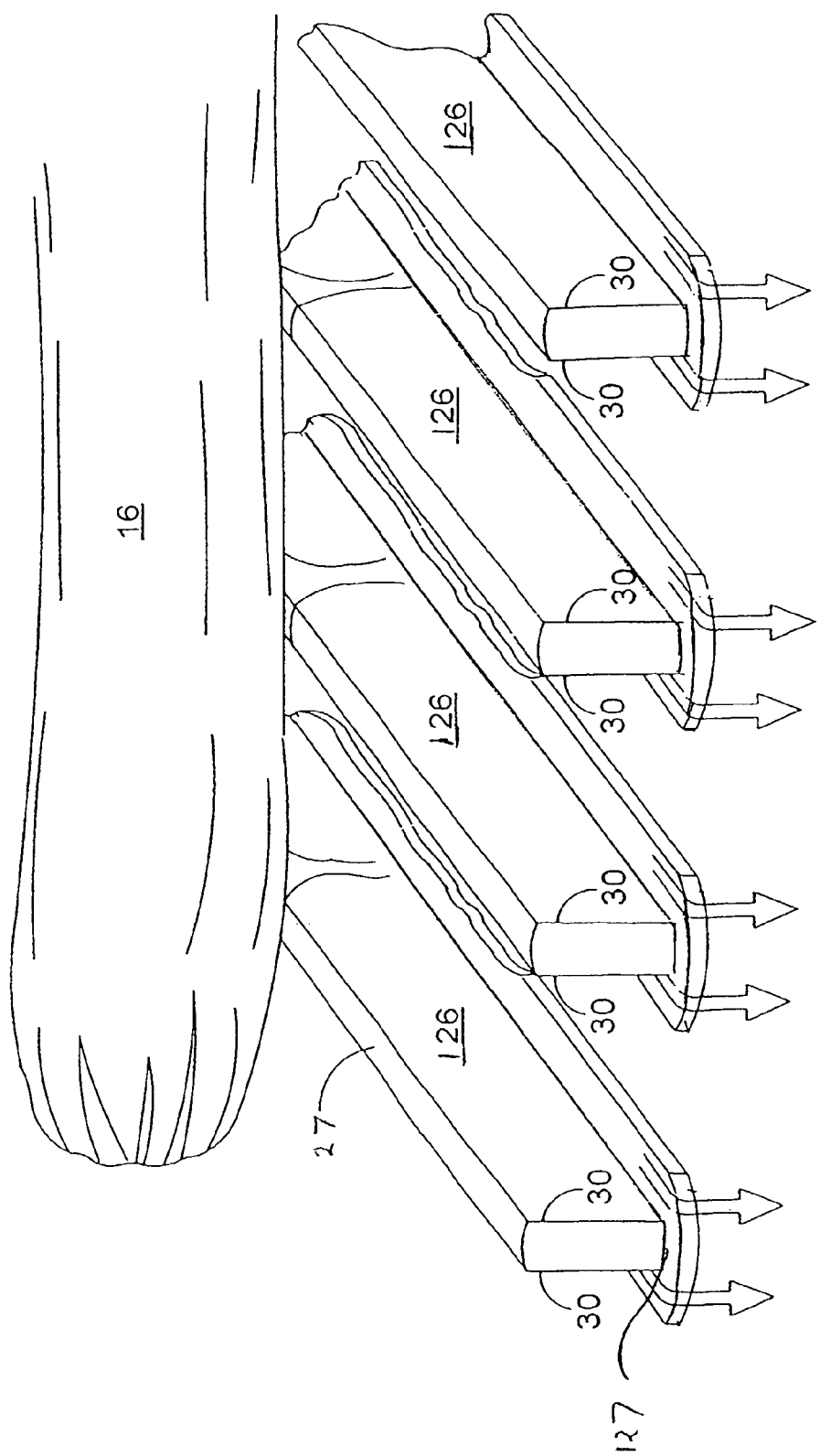
FIG. 4 shows schematically a perspective view of the heating rack of FIGS. 2 and 3 when in use.

In the construction of FIGS. 4 and 5 the collector units are formed from stainless steel strips and are maintained spaced apart by being secured at their ends to a support frame. The present invention further teaches that the collector units may be maintained spaced apart alternatively or additionally by a bridge section at a position intermediate the ends of the collector units. An example of a bridge section which is cast integrally with cast support sections is now described with reference to FIGS. 13 and 14, but the general shape features of the bridge section may be employed also in an intermediate bridge section for use in connecting collector units formed from strip material.

FIG. 13 shows part of two cast support sections 201 which are formed integrally with a bridge section 202, at a position which is intermediate the respective ends of the sections 201. Each bridge section has an upper surface 203 which is substantially co-planar with the upper, contact surfaces 204 of the support sections. The underside 205 of the bridge section is curved in a downwards direction from a central region 206 to the ends where it meets the side surfaces 207 of the support sections. Each bridge section 202 also has a pair of transverse side faces 208 (see FIG. 14). Optionally these are inclined towards one another in a direction away from the upper surface 203. In consequence any exudate flowing from an object on the surface 203 tends to be preferentially directed via the side faces 208 and underside 205, to the side faces 207 of the support sections in contrast to dripping downwards between the support sections and directly onto the heat source.

The invention claimed is:

1. A heating rack for subjecting a supported object to direct radiant heating from a heat source beneath the rack, said heating rack comprising:

a plurality of elongate support sections and a corresponding number of elongate collector sections whereby each support section for supporting an object to be heated has only one elongate collector section associated therewith for the collection of exudate, each elongate support section defining a contact surface which, in use, is for supporting an object to be heated by a heat source beneath the heating rack, each elongate support section having associated therewith a respective one of the elongate collector sections, each elongate collector section shaped to define a channel which, in use, is vertically aligned with a respective one of the elongate support sections for receiving all of the exudate flowing from the associated support section and to direct said exudate to a collection zone at an end of the channel; and each elongate support section and associated elongate collector section defining a collector unit and successive collector units being spaced apart so as to permit direct radiant heating of the supported object which is to heated by said heat source in a direction substantially perpendicular to a direction of spacing between the collector units concurrent with the collector section channels being able to receive the exudate, wherein said elongate support and collector sections of the collector unit are spaced apart over at least a part of the length of the elongate collector unit, the support section of the collector unit has a first side surface and a second side surface and the collector section of the collector unit in use extends under each said side surface of the support section of the collector unit thereby simultaneously to collect any exudate flowing down each of said side surfaces of the support section concurrent with the supported object being subject to heating by direct radiation of heat from the heat source via the spacings between successive collector units, neighboring support sections being spaced apart by at least one interconnecting bridge section which is positioned intermediate of ends of the support sections, and the bridge section having an upper surface which in use faces towards said supported object and an underside surface, said underside surface being inclined in a downward direction away from said upper surface, towards the side surface of at least one of the two support sections between which the bridge section extends whereby, in use, exudate received on the upper surface of the bridge section is directed to flow in a direction towards a side surface of at least one of the two support sections interconnected by said bridge section.

2. The heating rack according to claim 1, wherein the support and collector sections are spaced apart over at least 50% of the length of the collector unit.

3. The heating rack according to claim 1, wherein the support and collector sections of a collector unit are spaced apart by at least 1 mm and less than 10 mm.

4. The heating rack according to claim 3, wherein said spacing is less than 5 mm.

5. The heating rack according to claim 1, wherein the support and collector sections of the collector unit are joined together at points of contact whereby the two sections of the collector unit provide mutual structural support for one another.

6. The heating rack according to claim 1, wherein the support sections of the plurality of collector units are maintained spaced apart by transverse spacer means, and the support and collector sections may be moved apart for cleaning purposes.

7. The heating rack according to claim 1, wherein the spacing between the contact surfaces of successive support sections is at least 8 mm.

8. The heating rack according to claim 1, wherein the contact surface of the support section defines a trough which extends lengthwise of the support section.

9. The heating rack according to claim 1, wherein at least one of the collector section and the support section of the collector unit has a maximum width of the lower half thereof which is less than the maximum width of the upper half thereof, said upper half being that half which is closest to the contact surface of the collector unit.

10. The heating rack according to claim 1, wherein the minimum spacing of successive collector units is that between said contact surfaces, or the regions of side surfaces of the support sections which are closest to said contact surfaces.

11. The heating rack according to claim 1, wherein the contact surfaces of successive support sections are spaced apart by less than 15 mm.

12. The heating rack according to claim 11, wherein interconnecting bridge section(s) serve as transverse spacer means to maintain each of the collector or support sections of a plurality of collector units transversely spaced relative to one another.

13. The heating rack according to claim 12, wherein the interconnecting bridge section(s) has a substantially planar upper surface for confronting an object to be heated, and said upper surface is substantially co-planar with the contact surfaces of the two support sections between which the interconnecting bridge section extends.

14. The heating rack according to claim 1, wherein the spacing of neighbouring edges of successive collector sections is at least 3 mm.

15. The heating rack according to claim 14, wherein said spacing is at least 8 mm.

16. The heating rack according to claim 1, wherein neighbouring collector units are spaced apart to allow an object supported by the support surfaces of neighbouring collector units to be exposed directly to heat radiated from a heat source in a direction substantially perpendicular to the direction in which the said support surfaces are spaced apart.

17. A heating rack assembly comprising a heating rack according to claim 1 and support structure, wherein said support structure supports the elongate collector units in a manner in which the collector channels are each inclined to the horizontal thereby to encourage flow of exudate lengthwise in the channels.

18. A heating rack for subjecting a supported object to direct radiant heating from a heat source beneath the rack, said heating rack comprising:

a plurality of elongate support sections and a corresponding number of elongate collector sections whereby each elongate support section for supporting an object to be heated has only one elongate collector section associated therewith for the collection of exudate, each elongate support section defining a contact surface which, in use, is for supporting an object to be heated by a heat source beneath the heating rack, each elongate support section having associated therewith a respective one of the elongate collector sections, each elongate collector section shaped to define a channel which, in use, is vertically aligned with a respective one of the elongate support sections for receiving all of the exudate flowing from the associated support section and to direct said exudate to a collection zone at an end of the channel; and each elongate support section and associated collector section defining a collector unit, and successive collector units being spaced apart so as to permit direct radiant heating of the supported object which is to be heated by said heat source in a direction substantially perpendicular to a direction of spacing between the collector units concurrent with the collector section channels being able to receive the exudate, the contact surface of each of the support sections defining a trough which extends lengthwise of the support section, wherein said support and collector sections of the collector unit are spaced apart over at least a part of the length of the elongate collector unit, the support section of the collector unit has a first side surface and a second side surface and the collector section of the collector unit in use extends under each said side surface of the support section of the collector unit thereby simultaneously to collect any exudate flowing down each of said side surfaces concurrent with the supported object being subject to heating by direct radiation of heat from the heat source via the spacings between successive collector units, neighboring support sections being spaced apart by at least one interconnecting bridge section which is positioned intermediate of ends of the support sections, and the bridge section having an upper surface which in use faces towards said supported object and an underside surface, said underside surface being inclined in a downward direction away from said upper surface, towards the side surface of at least one of the two support sections between which the bridge section extends whereby, in use, exudate received on the upper surface of the bridge section is directed to flow in a direction towards a side surface of at least one of the two support sections interconnected by said bridge section.

19. A heating rack for subjecting a supported object to direct radiant heating from a heat source beneath the rack, said heating rack comprising:

a plurality of elongate support sections and a corresponding number of elongate collector sections whereby each elongate support section for supporting an object to be heated has only one elongate collector section associated therewith for the collection of exudate, each elongate support section defining a contact surface which, in use, is for supporting an object to be heated by a heat source beneath the heating rack, each elongate support section having associated therewith a respective one of the elongate collector sections, each elongate collector section shaped to define a channel which, in use, is vertically aligned with a respective one of the elongate support sections for receiving exudate from a supported object and to direct said exudate to a collection zone at an end of the channel; and each elongate support section and associated collector section defining a collector unit, and successive collector units being spaced apart so as to permit direct radiant heating of the supported object which is to be heated by said heat source in a direction substantially perpendicular to a direction of spacing between the collector units concurrent with the collector section channels being able to receive the exudate, the contact surface of each of the support sections defining a trough which extends lengthwise of the support section, wherein said support and collector sections of the collector unit are spaced apart over at least a part of the length of the elongate collector unit, the support section of the collector unit has a first side surface and a second side surface and the collector section of the collector unit in use extends under each said side surface of the support section of the collector unit thereby simultaneously to collect any exudate flowing down each of said side surfaces of the support section concurrent with the supported object being subject to heating by direct radiation of heat from the heat source via the spacings between successive collector units, the support section having a lower end region which lies closer to the collector section than said contact surface, said first and second side surfaces extending between said contact surface and said lower end region to direct exudate to flow thereover from the contact surface to the lower end region, and said lower end of the support section being narrower than the collector section channel as viewed in cross-section, whereby the channel extends outwards beyond the lower end of each said side surface, neighboring support sections being spaced apart by at least one interconnecting bridge section which is positioned intermediate of ends of the support sections, and the bridge section having an upper surface which in use faces towards said supported object and an underside surface, said underside surface being inclined in a downward direction away from said upper surface, towards the side surface of at least one of the two support sections between which the bridge section extends whereby, in use, exudate received on the upper surface of the bridge section is directed to flow in a direction towards a side surface of at least one of the two support sections interconnected by said bridge section.

20. The heating rack according to claim 19 wherein, as viewed in cross-section, each collector section channel extends outwards by at least 0.5 mm beyond the lower end region of each said side surface.

21. A heating rack for subjecting a supported object to direct radiant heating from a heat source beneath the rack, said heating rack comprising:

a plurality of elongate support sections and a corresponding number of elongate collector sections whereby each elongate support section for supporting an object to be heated has only one elongate collector section associated therewith for the collection of exudate, each elongate support section defining a contact surface which, in use, is for supporting an object to be heated by a heat source beneath the heating rack, each elongate support section having associated therewith a respective one of the elongate collector sections, each elongate collector section shaped to define a channel which, in use, is vertically aligned with a respective one of the elongate support section for receiving all of the exudate flowing from the associated support section and to direct said exudate to a collection zone at an end of the channel; and each elongate support section and associated collector section defining a collector unit, and successive collector units being spaced apart so as to permit direct radiant heating of the supported object which is to be heated by said heat source in a direction substantially perpendicular to a direction of spacing between the collector units concurrent with the collector section channels being able to receive the exudate, the contact surface of each of the support sections defining a trough which extends lengthwise of the support section, the collector and support sections of the collector unit being of substantially identical cross-sectional shape, wherein said support and collector sections of the collector unit are spaced apart over at least a part of the length of the elongate collector unit, the support section of the collector unit has a first side surface and a second side surface and the collector section of the collector unit in use extends under each said side surface of the support section of the collector unit thereby simultaneously to collect any exudate flowing down each of said side surfaces of the support section concurrent with the supported object being subject to heating by direct radiation of heat from the heat source via the spacings between successive collector units, the support section having a lower end region which lies closer to the collector section than said contact surface, said first and second side surfaces extending between said contact surface and said lower end region to direct exudate to flow thereover from the contact surface to the lower end region, and said lower end of the support section being narrower than the collector section channel as viewed in cross-section, whereby the channel extends outwards beyond the lower end of each said side surface, neighboring support sections being spaced apart by at least one interconnecting bridge section which is positioned intermediate of ends of the support sections, and the bridge section having an upper surface which in use faces towards said supported object and an underside surface, said underside surface being inclined in a downward direction away from said upper surface, towards the side surface of at least one of the two support sections between which the bridge section extends whereby, in use, exudate received on the upper surface of the bridge section is directed to flow in a direction towards a side surface of at least one of the two support sections interconnected by said bridge section.

22. The heating rack according to claim 1, wherein the plurality of elongate support sections are secured against transverse movement relative to the plurality of elongate collector sections.

23. The heating rack according to claim 18, wherein the plurality of elongate support sections are secured against transverse movement relative to the plurality of elongate collector sections.

24. The heating rack according to claim 19, wherein the plurality of elongate support sections are secured against transverse movement relative to the plurality of elongate collector sections.

25. The heating rack according to claim 21, wherein the plurality of elongate support sections are secured against transverse movement relative to the plurality of elongate collector sections.

* * * * *